(12) United States Patent
Huang et al.

(10) Patent No.: US 12,088,914 B2
(45) Date of Patent: Sep. 10, 2024

(54) METHOD AND APPARATUS FOR OPERATING A COMPANION PROCESSING UNIT

(71) Applicant: ZEKU TECHNOLOGY (SHANGHAI) CORP., LTD., Shanghai (CN)

(72) Inventors: Huang Huang, San Diego, CA (US); Yu Zhang, San Diego, CA (US)

(73) Assignee: ZEKU TECHNOLOGY (SHANGHAI) CORP., LTD., Shanghai (CN)

( * ) Notice: Subject to any disclaimer, the term of this patent is extended or adjusted under 35 U.S.C. 154(b) by 189 days.

(21) Appl. No.: 17/951,793

(22) Filed: Sep. 23, 2022

(65) Prior Publication Data

US 2023/0015427 A1    Jan. 19, 2023

Related U.S. Application Data

(63) Continuation of application No. PCT/US2021/024561, filed on Mar. 29, 2021.

(Continued)

(51) Int. Cl.
*H04N 23/667* (2023.01)
*G06N 3/08* (2023.01)
(Continued)

(52) U.S. Cl.
CPC ............ *H04N 23/667* (2023.01); *G06N 3/08* (2013.01); *G06T 1/20* (2013.01); *H04N 13/204* (2018.05); *G06T 2207/10021* (2013.01)

(58) Field of Classification Search
None
See application file for complete search history.

(56) References Cited

U.S. PATENT DOCUMENTS

2012/0281107 A1   11/2012   Sugimoto
2016/0284095 A1    9/2016   Chalom et al.
(Continued)

OTHER PUBLICATIONS

International Search Report issued in International application No. PCT/US2021/024561, mailed Jun. 9, 2021.
(Continued)

*Primary Examiner* — Mark T Monk
(74) *Attorney, Agent, or Firm* — BAYES PLLC (57) ABSTRACT

Embodiments of apparatus and method for operating a companion processing unit. In an example, an apparatus includes an application processor, a memory, and a companion processing unit. The apparatus also includes an image sensor. The application processor is configured to turn on the image sensor, perform a scene detection on an image received from the image sensor, and determine whether a scene category of the image is supported by the companion processing unit. In response to the scene category being supported by the companion processing unit, the application processor controls the companion processing unit to start a boot-up sequence corresponding to the scene category. The boot-up sequence enables the companion processing unit to enter a mission mode in which the companion processing unit is ready to receive and process image data from the image sensor and send processed image data to the application processor.

20 Claims, 6 Drawing Sheets

Related U.S. Application Data

(60) Provisional application No. 63/010,590, filed on Apr. 15, 2020.

(51) Int. Cl.
    *G06T 1/20*    (2006.01)
    *H04N 13/204*    (2018.01)

(56) References Cited

U.S. PATENT DOCUMENTS

| | | |
|---|---|---|
| 2019/0251670 A1 | 8/2019 | Kim et al. |
| 2020/0267347 A1* | 8/2020 | Sudo ................... H04N 5/772 |

OTHER PUBLICATIONS

Written Opinion of the International Searching Authority issued in International application No. PCT/US2021/024561, mailed Jun. 9, 2021.

* cited by examiner

METHOD AND APPARATUS FOR OPERATING A COMPANION PROCESSING UNIT

CROSS-REFERENCE TO RELATED APPLICATIONS

This application is a continuation of International Application No. PCT/US2021/024561, filed on Mar. 29, 2021, which claims the benefit of priority to U.S. Provisional Application No. 63/010,590, filed on Apr. 15, 2020, entitled "APPLICATION PROCESSOR SIDE AUTO SCENE DETECTION FOR IMAGE PROCESSING CO-PROCESSOR BOOT UP LATENCY HIDING AND STANDBY POWER REDUCTION," both of which are hereby incorporated by reference in their entireties.

BACKGROUND

Embodiments of the present disclosure relate to apparatuses and methods for operating a companion processing unit.

An application processor (AP) is often used for processing images on a mobile device. Nowadays, as demands for imaging of different scenes increase, smarter phone makers and mobile chipset vendors have the option to add image processing companion chip (CC) to pre-process pixel data from the image sensor, e.g., a camera, before the pixel data is streamed into AP. The addition of a CC can make the images more suitable for various scenes.

SUMMARY

Embodiments of apparatus and method for operating a companion processing unit herein.

For example, an apparatus includes an application processor, a memory operatively coupled to the application processor and configured to store instructions for execution by the application processor, and a companion processing unit operatively coupled to the application processor. The apparatus also includes an image sensor operatively coupled to the companion processing unit. The application processor is configured to turn on the image sensor, perform a scene detection on an image received from the image sensor, and determine whether a scene category of the image is supported by the companion processing unit. In response to the scene category being supported by the companion processing unit, the application processor controls the companion processing unit to start a boot-up sequence corresponding to the scene category. The boot-up sequence enables the companion processing unit to enter a mission mode in which the companion processing unit is ready to receive and process image data from the image sensor and send processed image data to the application processor.

In another example, a method for operating an apparatus is provided. The apparatus includes an application processor. The method includes turning on an image sensor, performing a scene detection on an image received from the image sensor, and determining whether a scene category of the image is supported by a companion processing unit operatively coupled to the application processor. The method also includes, in response to the scene category being supported by the companion processing unit, controlling the companion processing unit to start a boot-up sequence corresponding to the scene category. The boot-up sequence enables the companion processing unit to enter a mission mode in which the companion processing unit is ready to receive and process image data from the image sensor and send processed image data to the application processor.

In yet another example, a non-transitory computer-readable medium that stores a set of instructions is provided. When executed by at least one processor, the non-transitory computer-readable medium causes the at least one processor to perform a process for operating a companion processing unit operatively coupled to the at least one processor. The process includes turning on an image sensor operatively coupled to the companion processing unit, performing a scene detection on an image received from the image sensor, and determining whether a scene category of the image is supported by the companion processing unit. The process also includes, in response to the scene category being supported by the companion processing unit, controlling the companion processing unit to start a boot-up sequence corresponding to the scene category, the boot-up sequence enabling the companion processing unit to enter a mission mode in which the companion processing unit is ready to receive and process image data from the image sensor and send processed image data to the at least one processor.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of method and apparatus will now be described. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

Companion chips or CCs, e.g., image signal processor (ISP) chips, have been used to pre-process image data before it is transmitted to the application processor. There are three common motivations to add a CC. For example, CCs are added to increase the compatibility (e.g., missing features) of the AP with emerging sensors such that the image data processed by the AP can be suited for an increased number of scenes even though the design of the AP cannot be changed substantially. Also, CCs are added to support more advanced sensor configurations that cannot be handled by the AP, which is often designed to support the mainstream sensor types instead of certain other sensors with higher specs (resolution/frame per second). Further, CCs are added to improve the performance (e.g., image quality and/or speed) of the AP by adding new features that the AP cannot support.

There is a non-trivial initialization time required to prepare a CC from a non-function state to a function state, so initializing CC on demand when the use case starts will cause an unpleasant delay. On the other hand, however, having the CC always in fully functional or close-to-fully functional (retention) mode can adversely impact battery life. The user experience (latency) and power/battery life impact of an apparatus need to be carefully balanced, because the CC is usually not always needed. For example, a user uses a camera application but only during some specific use case scenarios, e.g., "nightscape."

Different operation schemes have been used to reduce the initialization delay and/or reduce the power consumption of the apparatus. In one approach, the CC undergoes a boot-up process and an initialization immediately after the AP undergoes a boot-up process; the CC is then switched to a low-power retention mode. This can minimize the latency when CC is needed by the user in a user select mode anytime later during the usage. The drawback of this approach includes that the preloaded code and data needs to be retained on the on-chip static random-access memory (SRAM) and/or dynamic random-access memory (DRAM) of the CC. Even with careful design and optimization, the impact on the device's baseline standby power can still be significant. In another approach, the CC undergoes a boot-up process and an initialization immediately after the camera application is launched regardless of the usage. This approach can minimize the latency when the user later selects to activate the mode that requires the main image processors (IPs) on CC. However, the drawback of this approach includes that unnecessarily turning on main IPs on CC can also adversely impact the battery life.

Embodiments of the present disclosure provide a solution to the latency and battery life issues. The proposed solution can reduce the initialization latency of a companion processing unit by "hiding the latency" while at the same time reduces the power consumption of the apparatus. According to the proposed solution, the AP of the apparatus can proactively detect the scene captured by the camera as soon as the camera is launched, to predict the mode the user might be using in the future, and initialize the main IPs on CC ahead of time. The AP employs certain configurations such as auto white balance, autofocus, and auto exposure (3A algorithms) the ISP on the AP as well as artificial intelligence (AI) assisted algorithm during the preview session or video recording session to determine the real-time scene and lighting condition. The 'calculated' scene information is used to determine the scene category of the real-time scene and whether the scene category is supported by the companion processing unit. The AP can then determine whether to turn on/warm up the relevant processing IPs on the companion processing unit based on the result of the determination. For example, if the AP determines the companion processing unit is supported by the companion processing unit, the AP may determine the possibility that the user will soon select to enter a mode corresponding to the scene category is high. The AP may start conditioning the functional blocks, e.g., in the companion processing unit, to be ready for function. To initialize/prepare the function blocks, the AP loads relevant code (e.g., neural network models) to the companion processing unit for the detected scene category.

By proactively detecting the scenes and starting to initialize the companion processing unit immediately after a detected scene category, the apparatus (or the companion processing unit) can be ready in a mode corresponding to the scene before the user selects the mode. The latency associated with initializing main IPs on the companion processing unit, such as DDR training, operating system (OS) boot, code loading, from the non-functional mode to a fully functional mode can be completely or partially hidden, e.g., without the user noticing any latency when deciding to select the mode corresponding to the scene. The solution can also be used to enable auto mode switching without the user manually configuring the mode through a user interface (UI). User experience can be improved. Meanwhile, because the main IPs on the companion processing unit is only turned on when the AP determines that the user has a very high chance to use the companion processing unit in the near future, thus reducing the power consumption associated with blindly initializing main IPs on the companion processing unit every time the camera application is launched or keeping the companion processing unit always in low-power retention state in the background. The impact to the battery life of the apparatus can be reduced.

Figure 1:
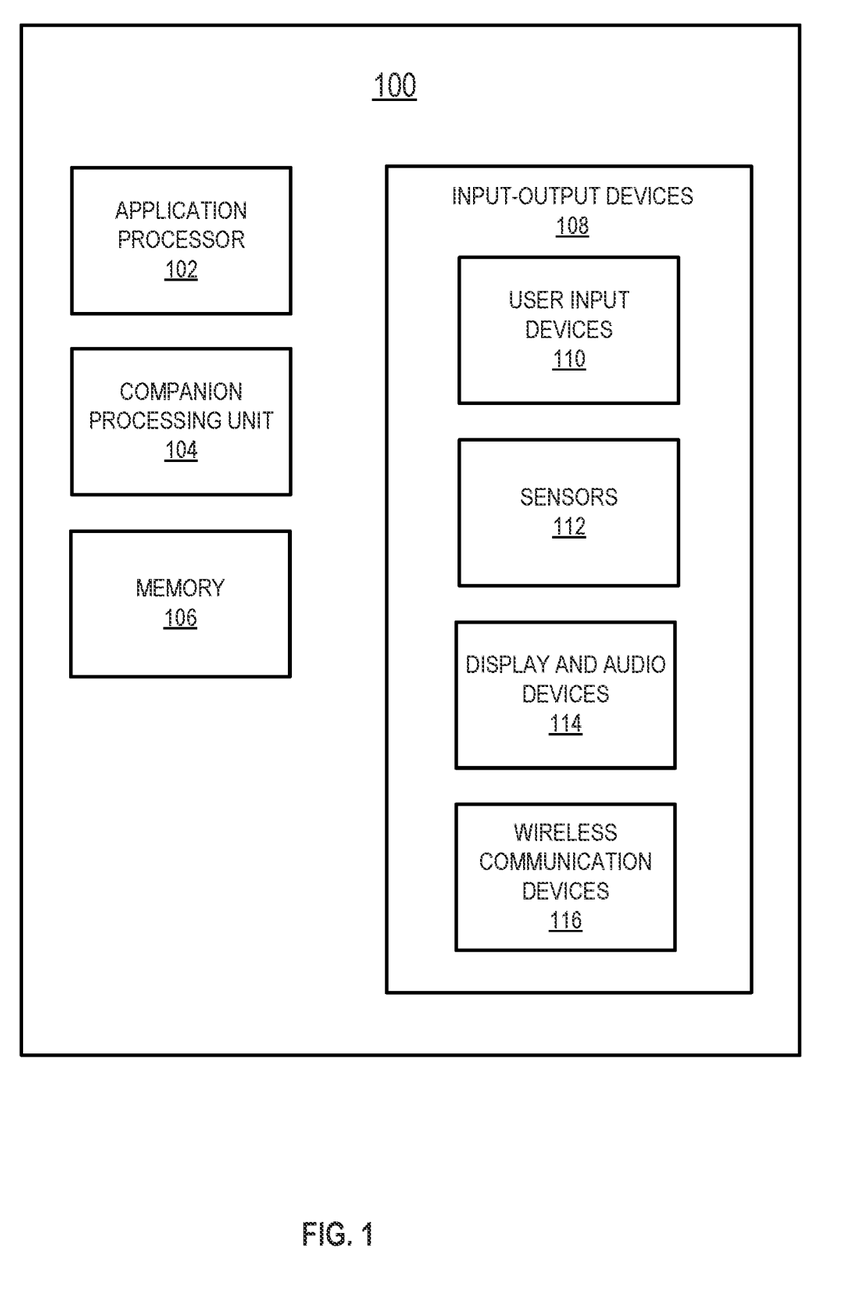
FIG. 1 illustrates a block diagram of an exemplary apparatus having an AP and a companion processing unit, according to some embodiments of the present disclosure.

FIG. 1 illustrates an exemplary block diagram of an apparatus 100 having an AP and a companion processing unit, according to some embodiments. Apparatus 100 may include an application processor (AP) 102 and a companion processing unit 104 operatively coupled to AP 102. Apparatus 100 may also include a memory 106, and input-output devices 108. Input-output device 108 may include user input devices 110, sensors 112, display and audio devices 114, and wireless communication devices 116. In some embodiments, apparatus 100 is a portable consumer electronic device, such as a mobile phone.

AP 102 may be the main application process of apparatus 100, and may host the OS of apparatus 100 and all the applications. AP 102 may be any kind of general-purpose processor such as a microprocessor, a microcontroller, a digital signal processor, or a central processing unit, and other needed integrated circuits such as glue logic. The term "processor" may refer to a device having one or more processing units or elements, e.g., a central processing unit (CPU) with multiple processing cores. AP 102 may be used to control the operations of apparatus 100 by executing instructions stored in memory 106, which can be in the same chip as AP 102 or in a separate chip from AP 102. AP 102 may also generate control signals and transmit them to various parts of apparatus 100 to control and monitor the operations of these parts. In some embodiments, AP 102 can run the OS of apparatus 100, control the communications between the user and apparatus 100, and control the operations of various applications. For example, AP 102 may be coupled to a communications circuitry and execute software to control the wireless communications functionality of apparatus 100. In another example, AP 102 may be coupled to companion processing unit 104 and input-output devices 108 to control the processing and display of sensor data (e.g., image data).

Companion processing unit 104 may include software and/or hardware operatively coupled to AP 102 and input-output devices 108. In some embodiments, components, e.g., circuitry, of companion processing unit 104 may be integrated on a single chip, which can be referred to as a companion chip. In some embodiments, companion processing unit 104 includes an image processing hardware coupled to (e.g., placed between) AP 102 and an image sensor, e.g., a camera, in sensors 112. companion processing unit 104 may include a suitable circuitry that, when controlled by AP 102, performs functions not supported by AP 102, e.g., pre-processing raw image data for AP 102. In various embodiments, companion processing unit 104 can include a field-programmable gate array (FPGA), an application-specific integrated circuit (ASIC), a graphics processing unit (GPU), a microprocessor, a microcontroller, a digital signal processor, and other needed integrated circuits for its purposes. The term "PreISP" is used as an abstraction for functional blocks, inside companion processing unit 104 that handle the functions not supported by AP 102. PreISP may include any suitable hardware and software that are used for pre-processing raw image data.

When controlled by AP 102, companion processing unit 104 may operate in two modes. The first mode is referred to as a "bypass" mode in which raw pixel data is transmitted to AP 102 through companion processing unit 104 using Mobile Industry Processor Interface (MIPI) Camera Serial Interface (CSI) interface without being processed by the PreISP of companion processing unit 104. The bypass mode can be activated during some "easier" use cases, such as taking snapshots, in which the workload can be handled completely by AP 102. The second mode is referred to as a "mission" mode in which the PreISP and certain devices operatively coupled to companion processing unit 104 pre-process the raw pixel data and send the pre-processed pixel data to AP 102 for further processing. For example, AP 102 may process the pixel data sent by companion processing unit 104 for preview on the display or video encoding.

Figure 2:
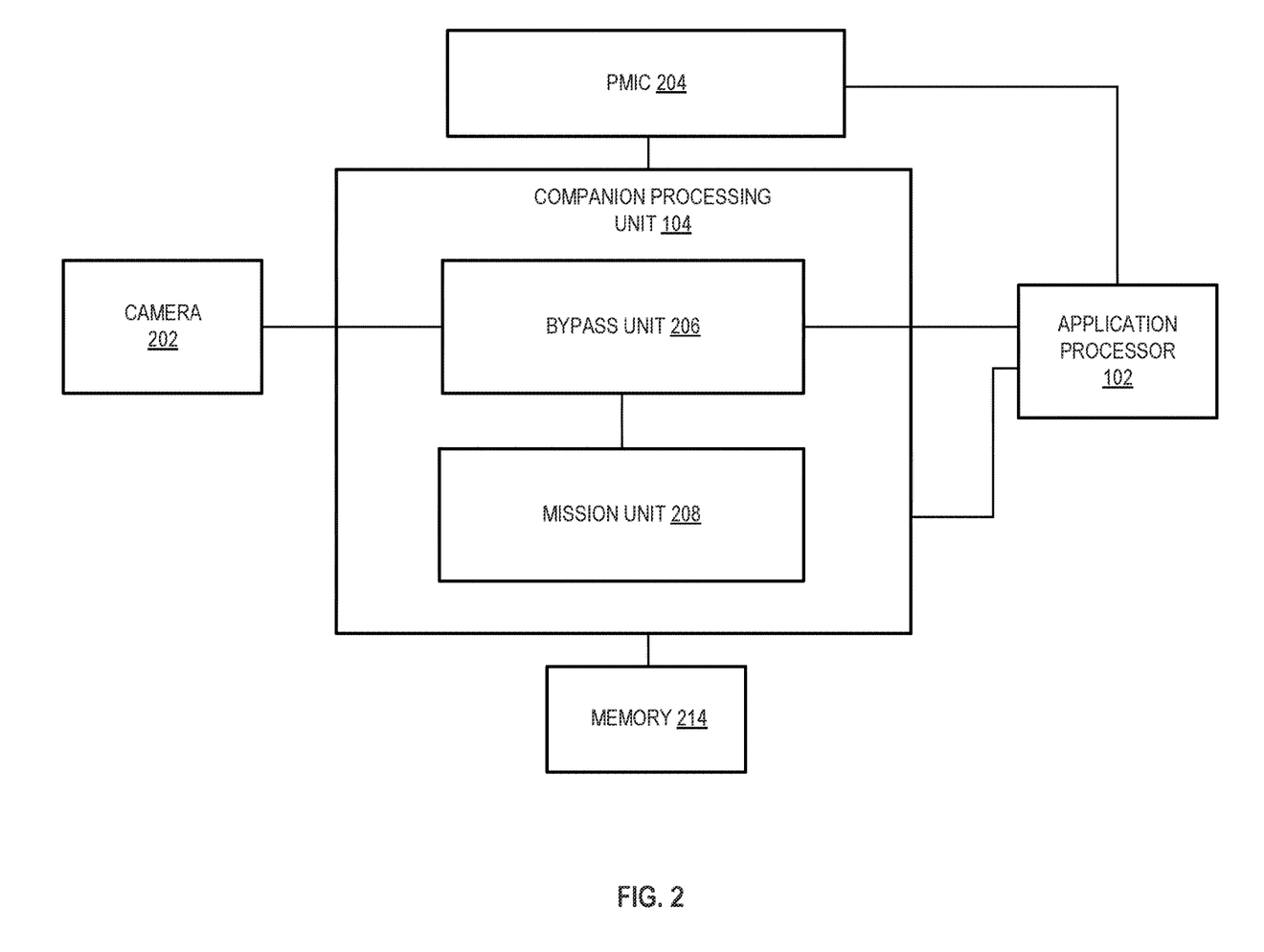
FIG. 2 illustrates an exemplary companion processing unit in connection with certain components, according to some embodiments of the present disclosure.

FIG. 2 illustrates an exemplary coupling amongst a camera 202, companion processing unit 104, and AP 102, according to some embodiments. AP 102 may transmit control signals and other data to companion processing unit 104 via an internal bus to control the operation of companion processing unit 104. Certain other components, such as a power management integrated circuit (PMIC) 204 and a memory 214 are operatively coupled to companion processing unit 104 for the operation of companion processing unit 104. PMIC 204 may be a dedicated power management circuitry that provides the power/voltages necessary for the operation of companion processing unit 104. Memory 214 may be a dedicated low-power double data rate (LPDDR) device that provides the caching/storage functions necessary for the operation of companion processing unit 104. In some embodiments, memory 214 includes a dynamic random-access memory (DRAM).

Companion processing unit 104 may include a bypass unit 206 and a mission unit 208, operatively coupled to each other. Each of bypass unit 206 and mission unit 208 includes suitable software and hardware for the functions of companion processing unit 104. Bypass unit 206 may be operatively coupled to camera 202 and AP 102. In some embodiments, bypass unit 206 includes a MIPI CSI receiver for receiving raw image data from camera 202, a multiplexer coupled to the MIPI CSI receiver to combine the raw image data, and a MIPI CSI transmitter coupled to the multiplexer and AP 102 to transmit the combined raw data to AP 102. In the bypass mode, raw image data can be transmitted to AP 102 by bypass unit 206 without being pre-processed by mission unit 208.

The multiplexer (or bypass unit 206) may also be operatively coupled to mission unit 208. In the mission mode, the multiplexer may transmit the combined raw image data to mission unit 208 for pre-processing. Mission unit 208 may transmit the processed image data to multiplexer, which then transmits the processed image data to AP 102 through the MIPI CSI transmitter.

In operation, when AP 102 detects a user launches camera 202, e.g., by tapping on the camera application on the display, AP 102 may launch/turn on camera 202 and start to predict the mode to be used by the user for the images captured by camera 202. The mode may correspond to certain configurations such as algorithm and/or hardware settings used in companion processing unit 104 and/or AP 102 to highlight certain features in the images. In some embodiments, AP 102 predicts the mode using artificial intelligence (AI) assisted algorithm and certain automated calculation as soon as camera 202 is launched, e.g., during a preview session and/or video recording session. The prediction operation may include scene detection and subsequent decision making. The AI-assisted algorithm may be run on AP 102. In some embodiments, the automated calculation includes calculation for automated white balance, automated autofocus, and automated exposure, e.g., "3A states." Other necessary computations may also be used.

When AP 102 receives a frame of an image (e.g., raw image data) from camera 202, AP 102 may perform a scene detection on the frame to determine a scene category of the image. AP 102 may also determine whether the scene is in a scene category supported by companion processing unit 104. In the present disclosure, an image includes/depicts a scene, and a scene category may be referred to as a collection of scenes that share similar features. For example, scene categories may include "beach," "pets," "landscape," "portrait," "face shot," "long shot," and so on. In some embodiments, raw image data of each scene category can be pre-processed under a respective mode, which includes specific software and hardware configuration in companion processing unit 104. For ease of description, the scene of the image is referred to as a "scene X," and the corresponding scene category of the image is referred to as a "category X." If AP 102 detects scene X is supported by companion processing unit 104 (or a mode of companion processing unit 104), AP 102 may condition companion processing unit 104 to be ready to receive and pre-process the raw image data. In some embodiments, AP 102 controls companion processing unit 104 to start a boot-up sequence corresponding to category X (or scene X). The boot-up sequence may include initializing components in mission unit 208, e.g., PreISP, with settings corresponding to category X. When the boot-up sequence is completed, companion processing unit 104 may enter the mission mode and ready to receive and pre-process the raw image data of category X (or scene X), and send the processed image data to AP 102. When companion processing unit 104 is in the mission mode, companion processing unit 104 may pre-process the raw image data using the algorithm corresponding to category X such that the processed image data can further be processed by AP 102 for display or other uses. For ease of description, the mission mode corresponding to category X is referred to as a "mode X." In some embodiments, if AP 102 determines scene X is not supported by companion processing unit 104, AP 102 starts to receive raw image data, via bypass unit 206 and mission unit 208 is not initialized.

In some embodiments, when camera 202 is launched, AP 102 starts PMIC 204 to provide power to companion processing unit 104 such that companion processing unit 104 can start to operate in a low-power mode, ready to receive control signals from AP 102 for initialization. If scene X is detected and supported by companion processing unit 104, AP 102 may start the initialization of companion processing unit 104. The initialization may include powering up and initializing the components (e.g., PreISP) in mission unit 208, perform double data rate (DDR) training on companion processing unit 104 and memory 214, and boot the OS on companion processing unit 104. AP 102 may also control the downloading of firmware (FW) and neural network (NN) model for category X onto companion processing unit 104. AP 102 may further initialize the hardware of mission unit 208, e.g., PreISP, e.g., by loading respective code and configuring voltages. Mission unit 208 may then be ready to receive and pre-process raw image data from camera 202.

Referring back to FIG. 1, memory 106 stores instructions (e.g., software; firmware) executed by AP 102 and/or companion processing unit 104. Memory 106 may also store data to be used by AP 102 and companion processing unit 104. For example, AP 102 and memory 106 may be used to run the camera application that allows the user to use apparatus 100 as a digital camera and capture photographs and videos using the camera (e.g., 202). In some embodiments, memory 106 is stored with the OS of apparatus 100. Memory 106 may include one or more different types of storage such as hard disk drive storage, nonvolatile memory, and volatile memory such as static random access memory (SRAM) and/or DRAM.

Input-output devices 108 allow apparatus 100 to receive data as well as provide data. Input-output devices 108 may include user input devices 110, sensors 112, display and audio devices 114, and wireless communications devices 116. User input devices 110 may include any suitable software and hardware for receiving inputs from a user, e.g., typing and voice, and generate respective control signals corresponding to these inputs. For example, user input devices 110 may include a touch screen and physical buttons. A user may tap on the touch screen using a fingertip or other suitable objects to control the operation of apparatus 100 based on preset programs. The touch screen may transmit the touch signal to AP 102 and execute any control signals transmitted by AP 102 as a response. The touch screen may provide an input interface and an output interface between apparatus 100 and the user. The touch screen may employ any suitable touch sensing technology such as resistive touch sensing, capacitive touch sensing, infrared touch sensing, acoustic touch sensing, etc. For instance, in the camera application, a camera icon may be displayed on the touch screen, which may be used to capture the photograph or video. In another example, a slider bar may be displayed on the display screen that allows the user to select the video option or the still photograph option in the camera application. Further, when using a camera application, the display screen may display a camera screen that allows the user to preview the images captured by the camera. Other examples of user input devices 110 may include, but are not limited to, keypads, physical buttons, microphones, trackballs, mice, joysticks, and so on.

Display and audio devices 114 may include the software and hardware to display and play information, e.g., information received from the user and provided to the user. In some embodiments, display and audio devices 114 include the display panel, which also functions as the touch screen. In other words, the display and the touch screen are integrated as one device/terminal, i.e., the display panel. The display panel may display images, such as preview images and videos captured by sensors 112 (e.g., camera 202) and processed by AP 102 and/or companion processing unit 104. For ease of description, in the present disclosure, the term "touch screen," "display," and "display panel" are interchangeable and are referred to as the same device. In some other embodiments, the touch screen and the display can be different devices.

Sensors 112 may include any sensing and tracking devices, and their respective circuitry. For example, sensor 112 may include inertial sensors, image sensors (e.g., in a camera), eye trackers, global positioning systems (GPS), biometric sensors, pressure sensors, heat sensors, etc., operatively coupled to AP 102. Sensors 112 may be controlled by the user via respective applications, while also being controlled and monitored by AP 102. Sensors 112 can convert the detected signals to signals/data and transmit the signals to AP 102 for processing. For example, when a user launches the camera (e.g., 202), e.g., an image sensor, AP 102 may start to receive raw image data from the camera for processing and decision making.

Wireless communications devices 116 may include communication circuitry used for a variety of different wireless communication networks and in accordance with any one of several different call protocols. For example, the communication circuitry may include radio frequency (RF) transceiver circuitry, antennas, etc. The wireless communication networks can include a cellular mobile phone network (e.g., a Global System for Mobile communication (GSM) network and a Long Term Evolution (LTE) network), including 2G, 3G, 4G, 5G networks; and an IEEE 802.11 network (WiFi or Wireless Local Area Network, WLAN) which may support wireless voice over internet protocol (VOIP).

Although not shown, apparatus 100 may also include a power unit that includes a battery and corresponding circuitry for providing electricity to various parts of apparatus 100. Apparatus 100 may also include interfaces for communication with external devices and/or charging the battery of apparatus 100. For example, the interfaces may include, but are not limited to, micro universal serial bus (USB) interfaces, multi-pin connectors, etc.

Figure 3:
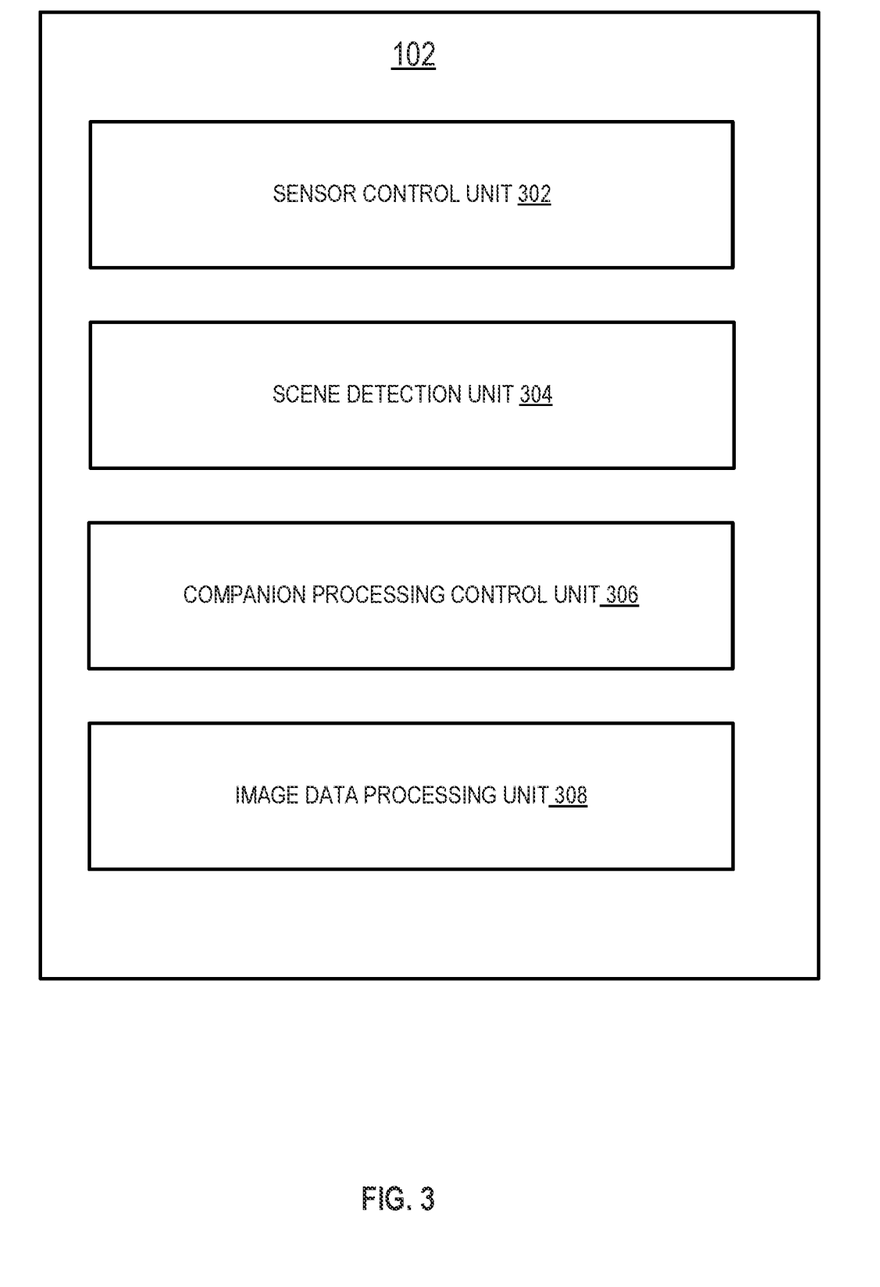
FIG. 3 illustrates a block diagram of an exemplary AP, according to some embodiments of the present disclosure.
Figure 4A:
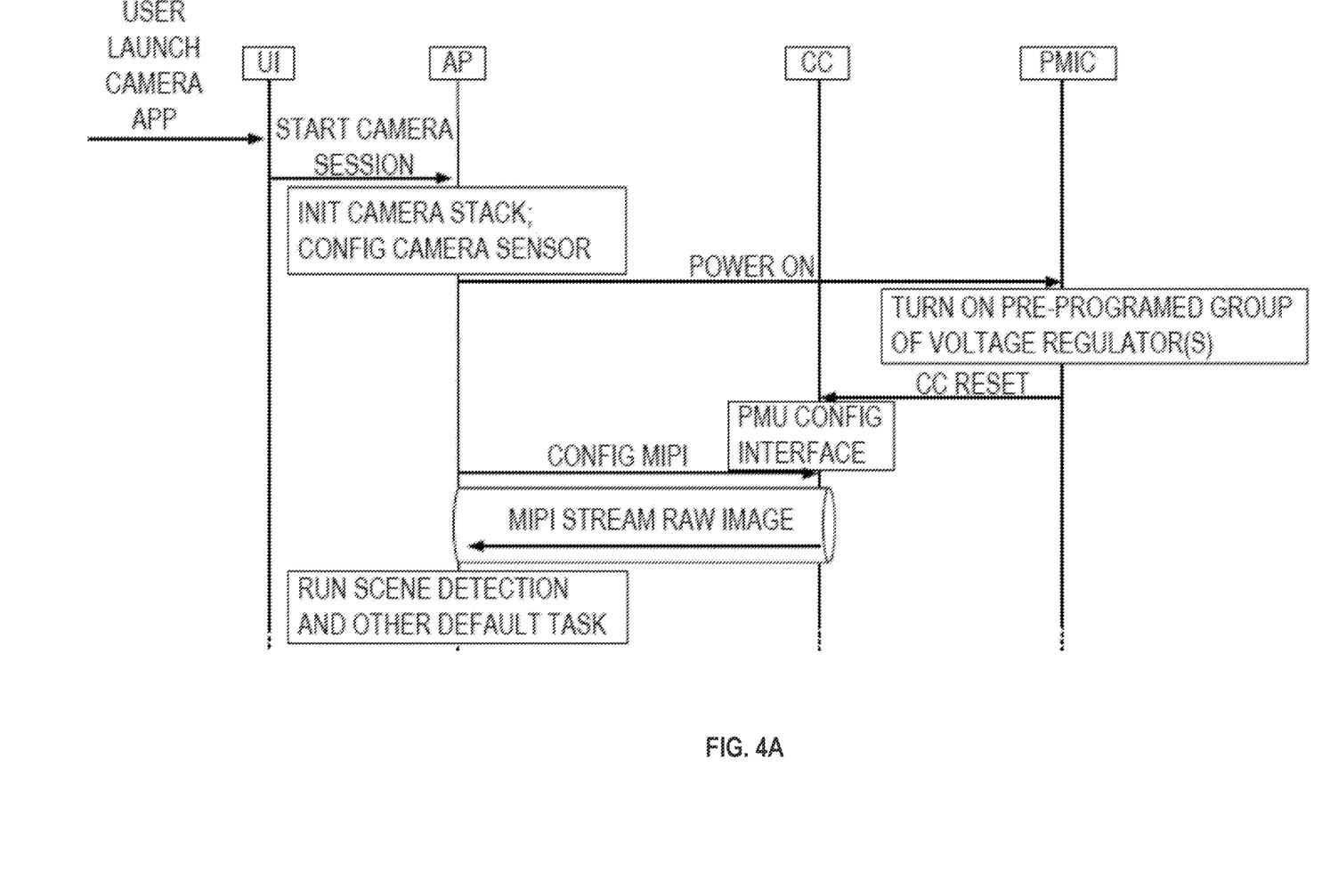
FIG. 4A illustrates part of an exemplary operation to operate a companion processing unit, according to some embodiments of the present disclosure.
Figure 4B:
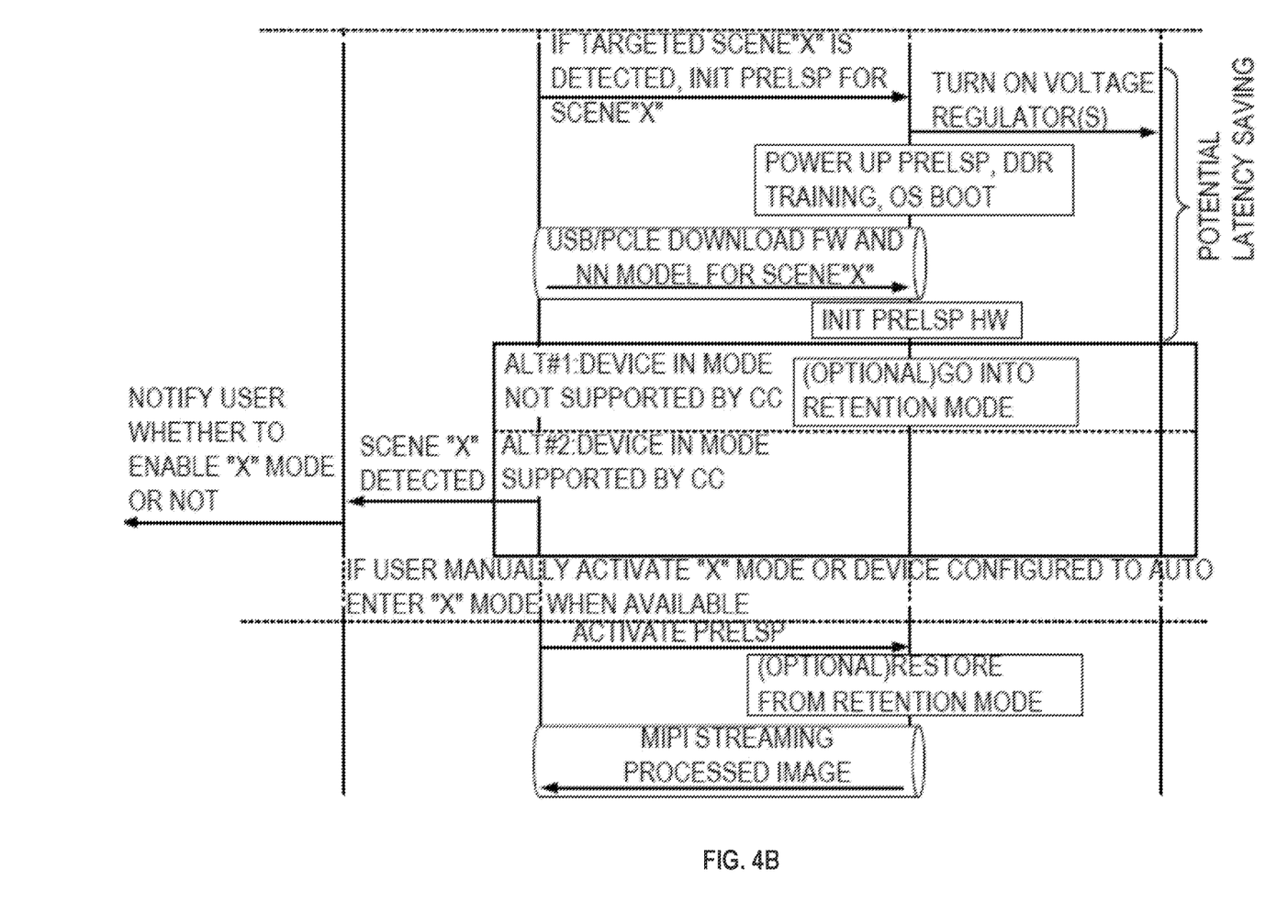
FIG. 4B illustrates another part of the operation in FIG. 4A, according to some embodiments of the present disclosure.

FIG. 3 illustrates functioning units of AP 102 for performing operations of the present disclosure, according to some embodiments. FIG. 4A illustrates a first part of an operation, and FIG. 4B illustrates a second part of the operation. For ease of illustration, FIGS. 3, 4A, and 4B are described together.

As shown in FIG. 3, AP 102 may include a sensor control unit 302, a scene detection unit 304, and a companion processing control unit 306, operatively coupled to one another. Sensor control unit 302 may be configured to control the operation and data transmission of the image sensor, which can include a camera and respective circuitry, in some embodiments. Scene detection unit 304 may be configured to perform a scene detection on the raw image data transmitted from the image sensor and determine whether the detected scene X is supported by the companion processing unit (e.g., 104), in some embodiments. Companion processing control unit 306 may be configured to control the operation of companion processing unit based on the results determined by scene detection unit 304, in some embodiments. Image data processing unit 308 may be configured to process raw image data from the image sensor and pre-processed image data from companion processing unit 104. For ease of illustration, FIGS. 3, 4A, and 4B are described together with FIGS. 1 and 2.

As shown in FIG. 4A, at the beginning of the operation, a user may launch the camera application, e.g., by tapping on the camera application icon on the touch screen of an apparatus 100. The UI of the apparatus 100 may start the camera session and transmit a signal to an AP 102, notifying AP 102 of the request to launch the camera application. Upon receiving the signal, sensor control unit 302 of AP 102 may turn on the camera sensor by starting to initiate the camera stack and configuring the camera sensor, which includes the camera and respective sensing circuitry for converting the received optical data into electrical signals. The camera sensor may then be conditioned for receiving raw image data. Companion processing control unit 306 of AP 102 may also send control signals to turn on ("power on") PMIC 204. In some embodiments, companion processing control unit 306 turns on PMIC 204 immediately after AP 102 receives the signal reflecting the start of the camera session. In some embodiments, a pre-programmed group of voltage regulators of PMIC 204 may first be turned on to provide power to companion processing unit 104. The pre-programmed group of voltage regulators allows companion processing unit 104 to enter a low-power mode, ready for initialization. In some embodiments, bypass unit 206 may be operated under the low-power mode. PMIC 204 may send a "power-on-reset" signal to companion processing unit 104 to reset companion processing unit 104.

After the reset, companion processing unit 104 may remove any data/settings from PreISP from previous operations. A power management unit (PMU) of companion processing unit 104 may send a signal to the hardware of MIPI CSI interfaces of companion processing unit 104 to configure the MIPI CSI interface. The MIPI CSI receiver and transmitter of companion processing unit 104 may then be ready to stream raw image data from the camera sensor to AP 102. Companion processing unit 104 may now enter the bypass mode.

As companion processing unit 104, or the MIPI CSI interfaces, starts to stream raw image data to AP 102, AP 102 may receive the raw image data in the form of frames. In some embodiments, each image or video includes at least one frame. Scene detection unit 304 may perform a scene detection on a frame (e.g., starting from the first frame) received by AP 102. In some embodiments, scene detection unit 304 may perform the scene detection using fixed-function ISP hardware and machine-learning (ML) based algorithm. In some embodiments, the fixed-function ISP hardware and ML-based algorithm may target a small number (e.g., one or more) of scene categories supported by companion processing unit 104. If the scene in the frame, scene X, matches a scene category (e.g., category X) supported by companion processing unit 104, scene detection unit 304 may then determine scene X is supported by companion processing unit 104. In some embodiments, scene X can be in a "pet" category, a "beach" category, a "landscape" category, or so on. In some embodiments, if no match is found between scene X and any scene categories supported by companion processing unit 104, scene detection unit 304 determines the scene is not supported by companion processing unit 104. Scene detection unit 304 may perform the scene detection at a suitable rate, which can be adjusted based on the actual performance and/or power requirement of AP 102, and should not be limited by the embodiments of the present disclosure. In some embodiments, the scene detection can be performed on each frame, every other frame, every five frames, and so on. In some embodiments, in addition to the scene detection, scene detection unit 304 also performs other default tasks/calculations, such as the algorithm for the 3A algorithms.

As shown in FIG. 4B, when scene detection unit 304 determines scene X, supported by companion processing unit 104, is detected, companion processing control unit 306 may send a control signal via a standard input/output (I/O) interface to turn on mission unit 208 (e.g., the PreISP) of companion processing unit 104. Companion processing control unit 306 may configure PreISP for scene X/category X. In some embodiments, companion processing control unit 306 controls companion processing unit 104 to turn on the voltage regulators in PMIC 204. The voltage regulators in PMIC 204 may provide sufficient electricity for mission unit 208 to operate. Companion processing control unit 306 may then control companion processing unit 104 to start a boot-up sequence, which can condition companion processing unit 104 to be ready for receiving and pre-processing raw image data from the camera sensor. In some embodiments, the boot-up sequence includes companion processing unit 104 downloading an OS model, a firmware model, and/or a neural network model from memory 106 (or memory 214, if necessary). In some embodiments, the downloads are conducted through a suitable interface/portal such as a USB portal and/or a peripheral component interconnect express (PCIe) interface between companion processing unit 104 and AP 102. The boot-up sequence may also include booting up the OS according to the OS model, starting DDR training on memory 214, and initializing the hardware of PreISP to be at work ("ready") condition. After the boot-up sequence is completed, companion processing unit 104 may be ready for the mission mode for category X (or in mode X), ready to receive and pre-process the raw image data from the camera sensor and send the processed image data to AP 102. When the boot-up sequence of companion processing unit 104 is completed, AP 102 may notify the user to enable/activate mode X or exit mode X. In some embodiments, AP 102 may control companion processing unit 104 to enable mode X automatically after the boot-up sequence is completed. In some embodiments, AP 102 may notify the user of the automatic activation of mode X. In some embodiments, the notification sent by AP 102 is displayed on the touch screen.

As shown in FIG. 4B, the latency may be regarded as the time period starting from the time scene X is detected to the end of initialization of the PreISP. The latency may take from a few hundred milliseconds to up to 1 second, depending on various factors such as the interface types and code size. Starting the boot-up sequence at the time scene X, supported by companion processing unit 104, is detected rather than a later time (e.g., when the user manually enables the mission mode or mode X) can potentially hide the latency partially or completely. The user may experience reduced or no latency when manually enters the mission mode (or mode X). The user experience can be improved.

Also, the PreISP on companion processing unit 104 is only turned on when AP 102 determines the user has a high chance of using companion processing unit 104 in the near future. Compared to those operation schemes in which the CC is turned on immediately after the AP boot up or immediately after the camera application is launched, the power consumption of apparatus 100 can be reduced using the operation scheme of the present disclosure.

In some embodiments, the user moves apparatus 100 such that the camera 202 may capture raw image data that includes different images/scenes than the previous scene. For example, when companion processing unit 104 is performing the boot-up sequence, AP 102 may receive a frame of an image that is in a scene category different from that of a previous scene category. For example, scene detection unit 304 may determine the scene in the image to be a "scene Y" and determine whether scene Y is supported by companion processing unit 104. Optionally, if scene Y is in a scene category that is not supported by companion processing unit 104, companion processing control unit 306 may control companion processing unit 104 to enter a retention mode, which is a low power mode that retains the configuration for mode X. In some embodiments, the retention mode retains the configuration of the companion processing unit 104 at a power lower than a reference power level. AP 102 may wait for the user to enable mode X, exit the configuration of mode after a preset period of time if no user response, or enter mode X automatically. In some other embodiments, if scene Y is in a scene category that is not supported by companion processing unit 104, companion processing control unit 306 controls companion processing unit 104 to enter a bypass mode when the boot-up sequence is completed such that the subsequent raw data can be transmitted to image data processing unit 308 of AP 102 to be processed, without being pre-processed by companion processing unit 104.

If scene detection unit 304 determines scene Y is in the same scene category as scene X, AP 102 may notify the user, when the boot-up sequence is completed, to enable mode X or exit mode X. In some embodiments, companion processing control unit 306 may control companion processing unit 104 to enable mode X automatically after the boot-up sequence is completed. In some other embodiments, if scene detection unit 304 determines scene Y is in a category Y, e.g., different scene category than that of scene X, and is supported by companion processing unit 104, scene detection unit 304 may control companion processing unit 104 to automatically enter the retention mode, or companion processing control unit 306 may control companion processing unit 104 to start a boot-up sequence for category Y.

When the user manually enables mode X or AP 102 controls companion processing unit 104 to automatically enable mode X, companion processing control unit 306 may activate the PreISP such that mission unit 208 can start pre-processing the raw image data transmitted from the camera sensor. The raw image data may be transmitted to mission unit 208 via the MIPI CSI receiver, and the pre-processed image data may be transmitted to image data processing unit 308 via the MIPI CSI transmitter. In some embodiments, if companion processing unit 104 was in the retention mode, companion processing control unit 306 may control companion processing unit 104 to restore the configuration from the retention mode.

Figure 5:
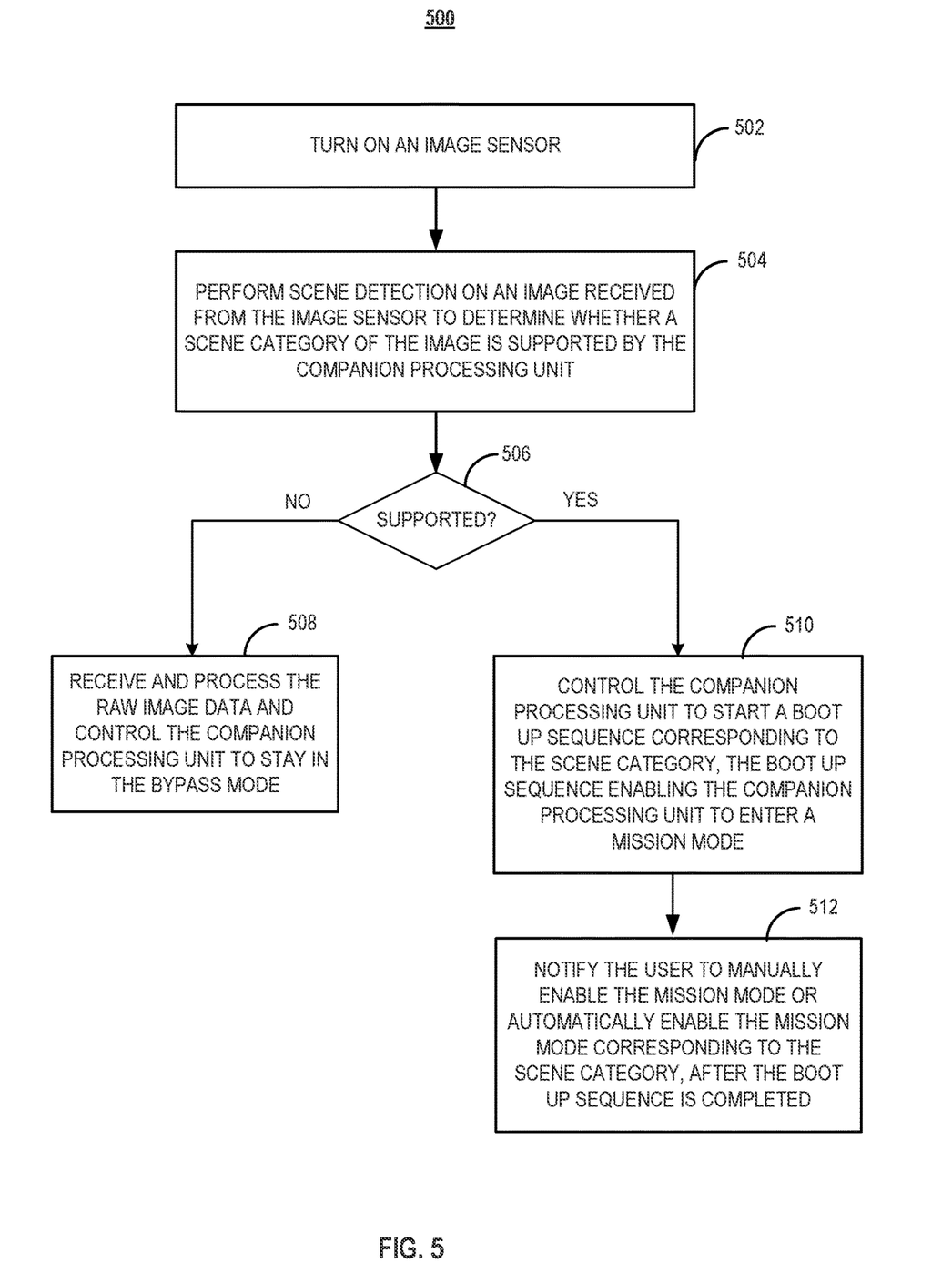
FIG. 5 illustrates a flowchart of an exemplary method to operate a companion processing unit, according to some embodiments of the present disclosure.

FIG. 5 illustrates a flowchart of an exemplary method 500 for operating an apparatus having an AP and a companion processing unit, according to some embodiments of the present disclosure. Method 500 will be described in connection with FIGS. 1-3, 4A, and 4B. It is understood that the operations shown in method 500 are not exhaustive and that other operations can be performed as well before, after, or between any of the illustrated operations. Further, some of the operations may be performed simultaneously, or in a different order than shown in FIG. 5. Method 500 may be performed by the AP of the apparatus.

As shown in FIG. 5, method 500 starts at operation 502, in which an image sensor is turned on. At the beginning of method 500, the AP (e.g., 102) may turn on the image sensor, e.g., camera 202, after sensing a user launching a camera application on a touch screen of apparatus (e.g., 100). Method 500 proceeds to operation 504, in which the AP performs a scene detection on an image received from the image sensor to determines whether a scene category of the scene depicted by the image is supported by the companion processing unit. The AP may perform a scene detection on the frame(s) of the image using fixed-function ISP hardware and ML-based algorithm to determine the scene category of the scene in the image and whether the scene category is supported by the companion processing unit. Method 500 proceeds to operation 506, in which the AP determines the operations of apparatus 100 based on the results of operation 504. If the scene category of the scene is not supported by the companion processing unit, method 500 proceeds to operation 508, in which the AP starts to receive and process the raw image data from the image sensor and controls the companion processing unit to enter or stay in the bypass mode. If the scene category of the scene is supported by the companion processing unit, method 500 proceeds to operation 510, in which the AP controls the companion processing unit to start a boot-up sequence corresponding to the scene category. The boot-up sequence enables the companion processing unit to enter the mission mode, ready to receive and process the raw image data, and ready to send the pre-processed image data to the AP. Method 500 further proceeds to operation 512, in which after the boot-up sequence is completed, the AP (i) notifies the user to manually enable the mission mode corresponding to the scene category or (ii) controls the companion processing unit to automatically enter the mission mode corresponding to the scene category. In some embodiments, after the boot-up sequence is completed and the category scene changes, e.g., because of a change of scenes, the AP may control the companion processing unit to enter a retention mode which retains the configuration when the boot-up sequence is completed or control the companion processing unit to start a boot-up sequence for the new/changed scene category.

In various aspects of the present disclosure, the functions described herein may be implemented in hardware, software, firmware, or any combination thereof. If implemented in software, the functions may be stored on or encoded as instructions or code on a non-transitory computer-readable medium. Computer-readable media includes computer storage media. Storage media may be any available media that can be accessed by a computing device, such as apparatus 100 in FIG. 1. By way of example, and not limitation, such computer-readable media can include random-access memory (RAM), read-only memory (ROM), EEPROM, CD-ROM or other optical disk storage, hard disk drive (HDD), such as magnetic disk storage or other magnetic storage devices, Flash drive, solid state drive (SSD), or any other medium that can be used to carry or store desired program code in the form of instructions or data structures and that can be accessed by a processing system, such as a mobile device or a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

According to one aspect of the present disclosure, an apparatus includes an application processor, a memory operatively coupled to the application processor and configured to store instructions for execution by the application processor, and a companion processing unit operatively coupled to the application processor. The apparatus also includes an image sensor operatively coupled to the companion processing unit. The application processor is configured to turn on the image sensor, perform a scene detection on an image received from the image sensor, and determine whether a scene category of the image is supported by the companion processing unit. In response to the scene category being supported by the companion processing unit, the application processor controls the companion processing unit to start a boot-up sequence corresponding to the scene category. The boot-up sequence enables the companion processing unit to enter a mission mode in which the companion processing unit is ready to receive and process image data from the image sensor and send processed image data to the application processor.

In some embodiments, to start the boot-up sequence, the application processor is configured to control the companion processing unit to provide electricity to the companion processing unit and initialize an image processing unit in the companion processing.

In some embodiments, to perform the scene detection on the image, the application processor is configured to receive a frame of the image from the image sensor and perform a scene detection algorithm on the frame.

In some embodiments, to perform the scene detection algorithm, the application processor is configured to use at least one of a fixed-function ISP hardware in the application processor or a ML based algorithm.

In some embodiments, the application processor is further configured to perform at least an auto white balance, an autofocus, or an auto exposure on the frame.

In some embodiments, the application processor is configured to control the companion processing unit to enter the mission mode automatically after the boot-up sequence is completed.

In some embodiments, the application processor is configured to notify a user to manually control the companion processing unit to enter the mission mode after the boot-up sequence is completed.

In some embodiments, the application processor is further configured to, in response to receiving a frame of a second image from the image sensor, perform a scene detection on the second image, and determine whether a second scene category of the second image is the same as the scene category. The application processor is also configured to, in response to the second scene category being different from the scene category and the boot-up sequence for the scene category being completed, control the companion processing unit to enter a retention mode in which the companion processing unit maintains settings of the completed boot-up sequence at a power lower than a reference power level.

In some embodiments, the application processor is further configured to, in response to receiving at least one of a command from the user to enter the mission mode or automatically entering the mission mode after a period of time, and restore settings of the mission mode from the retention mode.

In some embodiments, the image sensor includes a camera.

According to another aspect of the present disclosure, a method for operating an apparatus, the apparatus including an application processor, the method includes turning on an image sensor, performing a scene detection on an image received from the image sensor, and determining whether a scene category of the image is supported by a companion processing unit operatively coupled to the application processor. The method also includes, in response to the scene category being supported by the companion processing unit, controlling the companion processing unit to start a boot-up sequence corresponding to the scene category. The boot-up sequence enables the companion processing unit to enter a mission mode in which the companion processing unit is ready to receive and process image data from the image sensor and send processed image data to the application processor.

In some embodiments, the method further includes, to start the boot-up sequence, providing electricity to the companion processing unit and initializing an image processing unit in the companion processing unit.

In some embodiments, the further includes, to perform the scene detection on the image, receiving a frame of the image from the image sensor and performing a scene detection algorithm on the frame.

In some embodiments, the method further includes, to perform the scene detection algorithm, using at least one of a fixed-function ISP hardware in the application processor or a ML based algorithm.

In some embodiments, the method further includes performing at least an auto white balance, an auto focus, or an auto exposure on the frame.

In some embodiments, the method further includes controlling the companion processing unit to enter the mission mode automatically after the boot-up sequence is completed.

In some embodiments, the method further includes notifying a user to manually control the companion processing unit to enter the mission mode after the boot-up sequence is completed.

In some embodiments, the method further includes, in response to receiving a frame of a second image from the image sensor, performing a scene detection on the second image, and determining whether a second scene category of the second image is the same as the scene category. The method also includes, in response to the second scene category being different from the scene category and the boot-up sequence for the scene category being completed, controlling the companion processing unit to enter a retention mode in which the companion processing unit maintains settings of the completed boot up sequence at a power lower than a reference power level.

In some embodiments, the method further includes, in response to receiving at least one of a command from the user to enter the mission mode or automatically entering the mission mode after a period of time, restoring settings of the mission mode from the retention mode.

In some embodiments, the image sensor includes a camera.

According to another aspect of the present disclosure, a non-transitory computer-readable medium that stores a set of instructions, when executed by at least one processor, causes the at least one processor to perform a process for operating a companion processing unit operatively coupled to the at least one processor. The process includes turning on an image sensor operatively coupled to the companion processing unit, performing a scene detection on an image received from the image sensor, and determining whether a scene category of the image is supported by the companion processing unit. The process also includes, in response to the scene category being supported by the companion processing unit, controlling the companion processing unit to start a boot-up sequence corresponding to the scene category, the boot-up sequence enabling the companion processing unit to enter a mission mode in which the companion processing unit is ready to receive and process image data from the image sensor and send processed image data to the at least one processor.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The particular arrangements provided are illustrative and without limitation. Accordingly, the functional blocks, modules, and steps may be re-ordered or combined in different ways than in the examples provided above. Likewise, some embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. An apparatus, comprising:
an application processor;
a memory operatively coupled to the application processor and configured to store instructions for execution by the application processor;
a companion processing unit operatively coupled to the application processor; and
an image sensor operatively coupled to the companion processing unit,
wherein the application processor is configured to:
turn on the image sensor;
perform a scene detection on an image received from the image sensor;
determine whether a scene category of the image is supported by the companion processing unit; and
in response to the scene category being supported by the companion processing unit, control the companion processing unit to start a boot-up sequence corresponding to the scene category, the boot-up sequence enabling the companion processing unit to enter a mission mode in which the companion processing unit is ready to receive and process image data from the image sensor and send processed image data to the application processor.

2. The apparatus of claim 1, wherein to start the boot-up sequence, the application processor is configured to control the companion processing unit to:
provide electricity to the companion processing unit; and
initialize an image processing unit in the companion processing.

3. The apparatus of claim 1, wherein to perform the scene detection on the image, the application processor is configured to:
receive a frame of the image from the image sensor; and
perform a scene detection algorithm on the frame.

4. The apparatus of claim 3, wherein to perform the scene detection algorithm, the application processor is configured to use at least one of a fixed-function image signal processor (ISP) hardware in the application processor or a machine learning (ML) based algorithm.

5. The apparatus of claim 3, wherein the application processor is further configured to perform at least an auto white balance, an autofocus, or an auto exposure on the frame.

6. The apparatus of claim 1, wherein the application processor is configured to control the companion processing unit to enter the mission mode automatically after the boot-up sequence is completed.

7. The apparatus of claim 1, wherein the application processor is configured to notify a user to manually control the companion processing unit to enter the mission mode after the boot-up sequence is completed.

8. The apparatus of claim 1, wherein the application processor is further configured to, in response to receiving a frame of a second image from the image sensor,
perform a scene detection on the second image;
determine whether a second scene category of the second image is the same as the scene category; and in response to the second scene category being different from the scene category and the boot-up sequence for the scene category being completed, control the companion processing unit to enter a retention mode in which the companion processing unit maintains settings of the completed boot-up sequence at a power lower than a reference power level.

9. The apparatus of claim 7, wherein the application processor is further configured to:
in response to receiving at least one of a command from the user to enter the mission mode or automatically entering the mission mode after a period of time; and
restore settings of the mission mode from a retention mode.

10. The apparatus of claim 1, wherein the image sensor includes a camera.

11. A method for operating an apparatus, the apparatus comprising an application processor, the method comprising:
turning on an image sensor;
performing a scene detection on an image received from the image sensor;
determining whether a scene category of the image is supported by a companion processing unit operatively coupled to the application processor; and
in response to the scene category being supported by the companion processing unit, controlling the companion processing unit to start a boot-up sequence corresponding to the scene category, the boot-up sequence enabling the companion processing unit to enter a mission mode in which the companion processing unit is ready to receive and process image data from the image sensor and send processed image data to the application processor.

12. The method of claim 11, further comprising:
providing electricity to the companion processing unit and initializing an image processing unit in the companion processing unit.

13. The method of claim 11, further comprising:
receiving a frame of the image from the image sensor; and
performing a scene detection algorithm on the frame.

14. The method of claim 13, further comprising: using at least one of a fixed-function image signal processor (ISP) hardware in the application processor or a machine learning (ML) based algorithm.

15. The method of claim 13, further comprising: performing at least an auto white balance, an auto focus, or an auto exposure on the frame.

16. The method of claim 11, further comprising: controlling the companion processing unit to enter the mission mode automatically after the boot-up sequence is completed.

17. The method of claim 11, further comprising notifying a user to manually control the companion processing unit to enter the mission mode after the boot-up sequence is completed.

18. The method of claim 11, further comprising:
performing a scene detection on a second image;
determining whether a second scene category of the second image is the same as the scene category; and
in response to the second scene category being different from the scene category and the boot-up sequence for the scene category being completed, controlling the companion processing unit to enter a retention mode in which the companion processing unit maintains settings of the completed boot up sequence at a power lower than a reference power level.

19. The method of claim 17, further comprising:
in response to receiving at least one of a command from the user to enter the mission mode or automatically entering the mission mode after a period of time; and
restoring settings of the mission mode from a retention mode.

20. A non-transitory computer-readable medium that stores a set of instructions, when executed by at least one processor, causes the at least one processor to perform a process for operating a companion processing unit operatively coupled to the at least one processor, the process comprising:
turning on an image sensor operatively coupled to the companion processing unit;
performing a scene detection on an image received from the image sensor;
determining whether a scene category of the image is supported by the companion processing unit; and
in response to the scene category being supported by the companion processing unit, controlling the companion processing unit to start a boot-up sequence corresponding to the scene category, the boot-up sequence enabling the companion processing unit to enter a mission mode in which the companion processing unit is ready to receive and process image data from the image sensor and send processed image data to the at least one processor.

* * * * *